Patented Aug. 19, 1952

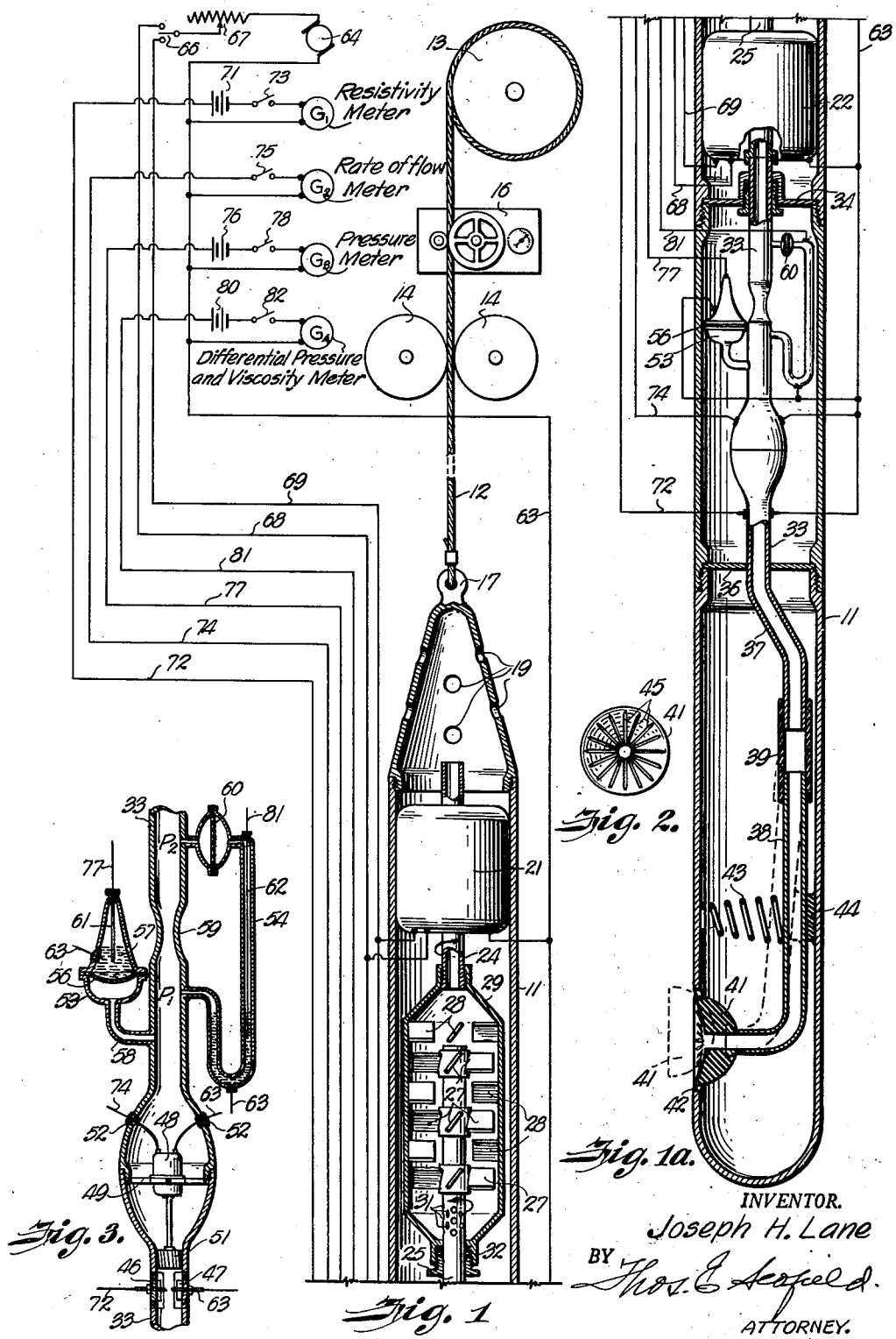

2,607,222

UNITED STATES PATENT OFFICE 2,607,222

FORMATION TESTER

Joseph H. Lane, Kansas City, Mo.

Application May 28, 1946, Serial No. 672,749

16 Claims. (Cl. 73—155)

The present invention relates in general to the art of determining the nature of subterranean formations and reservoirs, and more particularly to apparatus for testing oil wells or other bore holes.

In seeking petroleum and other deposits, information as to the nature of the various formations traversed by the bore hole assumes great importance. Attempts have been made to secure such information by taking samples of the fluid found at different levels in the well, or samples of the rock formation itself, or both, and bringing them to the surface for examination. This is a troublesome process, and it is far from satisfactory because when thus removed from their natural environment the samples may not be relied upon to yield much of the information desired.

Broadly speaking therefore it is the object of the present invention to test such formation in its natural environment.

More specifically it is an object of the invention to determine the permeability of the formation without removing samples thereof to the surface; and in like fashion to determine the reservoir pressure or rock pressure and, in the case of an oil or gas bearing strata, the thickness of the pay formation.

Another object of the invention is to determine the type of fluid in the rock formation without bringing any of the fluid to the surface. A further object is to provide facilities for testing an electrical characteristic and/or a physical characteristic of the fluid while same remains at its natural level in the well.

Another object of the invention is to provide a testing instrument which may be lowered into a bore hole, and which is capable of isolating a small section of the side wall at any selected level in the bore hole and determining the character of the formation and fluid in that section. A further object is to provide an arrangement for raising and lowering such an instrument quickly and easily in order to test successive sections of the side wall.

An important feature of this instrument resides in my novel arrangement for securing at any level in the well rock fluid which is uncontaminated by other fluid in the bore hole. Another feature resides in my provision of a chamber wherein the rock fluid is analyzed at its natural level in the well, together with facilities for registering the results of the analysis at the surface.

Other objects and features of my invention will appear from the following description.

In the accompanying drawings which form a part of the instant specification and are to be read in conjunction therewith and in which like reference numerals are employed to indicate like parts of the various views, Fig. 1 is a view of the upper portion of my sampling instrument taken in longitudinal cross section, together with a diagrammatic illustration of the hoist and electrical instruments which make up the surface group, Fig. 1a is a view of the lower portion of my sampling instrument partly in cross section and partly in elevation, Fig. 2 is a view in elevation of the suction cup which forms a part of my sampling instrument, and Fig. 3 is an enlarged cross sectional view of another part of the sampling instrument.

Referring more particularly to the drawings, the sampling instrument is housed in a generally cigar-shaped casing 11 which is adapted to be lowered in the bore hole by means of a cable 12 attached to the upper end of the casing. A hoist 13 is provided at the surface for paying the cable out or reeling it in as desired, and the upper end of the cable always is held in proper position over the mouth of the hole by a pair of guide rollers 14. At a point between the reel and the guide rollers the cable passes through a conventional depth-registering device as indicated schematically at 16; this is so calibrated that it always registers the distance of the sampling instrument below the surface of the ground.

Preferably the casing 11 of the sampling unit is made in sections to facilitate the assembly of the various parts therein, the individual sections being screwed to one another as shown or secured end-to-end in any other suitable way. The uppermost section is generally conical in shape and has at its tip a ring 17 to which the cable is attached. In this section are a number of openings 19 for a purpose to be described hereinafter.

The next lower section of the casing contains a pair of reversible pump motors 21 and 22, one positioned above the other and both immovably secured to the interior of the casing. The motors have hollow shafts 24 and 25, respectively, through which fluid is adapted to be driven by a pump positioned between the two motors. This pump may be of any known construction. Preferably, however, it comprises a series of impeller blades 27 rigidly affixed to the lower motor shaft 25 and another series of oppositely pitched impeller blades 28 projecting inwardly from the pump housing 29, which in turn is rigidly secured to shaft 24 of the upper motor. The blades are arranged in levels or tiers to give successive pumping stages; for purposes of illustration three stages have been shown but it will be appreciated that any number of stages may be provided. The upper end of shaft 25 is closed, fluid from the interior of that shaft being admitted into the pump housing through a number of openings 31 positioned below the impeller blades.

In operation, the two shafts are driven in opposite directions by their respective motors so that no resultant torque tending to rotate the casing 11 about its vertical axis is produced. To permit such counter-rotation of the blades without accompanying leakage at the base of the pump housing a suitable stuffing box 32 is provided at that point. When the two shafts are rotated in the direction indicated by the arrows fluid is driven upwardly through the pump; and when they are reversed it is driven downwardly.

Immediately below the lower pump motor is the analyzing chamber of my sampling instrument. This comprises a stationary tubular member 33 held in vertical alignment with the axis of the casing 11 by means of a centering flange 34 at the top and a centering flange 36 near the bottom. The upper end of this tubular member communicates with the hollow shaft of the lower pump motor as shown, while below flange 36 it contains an offset 37. Below the offset is an L-shaped pipe 38 whose upper end is connected to the lower end of tube 33 by a flexible coupling 39.

A concave-faced suction cup 41 of rubber or like elastic material is secured to the lower end of pipe 38 so that it occupies an opening 42 in the lowest section of casing 11. Adapted to move in and out of this opening, as will be explained presently, the suction cup normally is held in the position shown by a light coiled spring 43 which urges the lowermost end of pipe 38 to the right until its bumper 44 rests against the inner wall of the casing. As shown in Fig. 2, the face of the suction cup contains grooves 45 extending radially outward from a center opening which communicates with pipe 38.

Referring more particularly to Fig. 3 where the analyzing chamber of the sampling unit is shown in enlarged cross section, a pair of electrodes 46 and 47 will be noted in the lower part of the tube 33. These are spaced across from one another and suitably insulated from the walls of the tube. Above the electrodes and within an enlarged portion of the tube is a small electrical generator 48 supported by a spider or frame 49 having apertures through which fluid may flow past the generator. This flow of fluid drives the generator by rotating a small screw or turbine 51 secured to its drive shaft. To facilitate insertion of the generator in the analyzing chamber, tube 33 preferably is formed in two separate pieces which are screwed together as shown after the generator has been put in place. The generator's output leads extend through insulating and sealing bushings 52 in the wall of tube 33 to an external circuit which will be described presently.

Connected to tube 33 in the region just above the enlarged portion thereof are two pressure gauges 53 and 54. The first of these gauges has a flexible diaphragm 56 supporting a body of mercury 57 within an upwardly tapered closed vessel. Above the mercury a compressible gas is confined within the vessel. A small pipe 58 connects tube 33 with the under side of the diaphragm.

The second gauge 54 is of the differential type; it comprises a mercury filled U-tube the two legs of which communicate with tube 33 at longitudinally spaced-apart points $P_1$ and $P_2$. A constriction 59 in tube 33 intermediate these points presents additional resistance to the flow of fluid and hence accentuates the difference of pressure between said points. A flexible diaphragm 60 is included in one leg of the U-tube to prevent the fluid in tube 33 from finding its way into that leg of the tube. The space between the right-hand side of this diaphragm and the surface of the mercury should be filled with oil or other incompressible fluid of high electrical resistance.

Each gauge has an electrode which makes contact with the mercury therein and also has a resistance element (61, 62) extending down into the mercury from above. The lower portion of the resistance element in each case therefore is short circuited by the mercury and the resistance of the remaining portion is determined by the level of the mercury in the gauge.

Turning attention to the electrical circuits shown, it will be noted that each pump motor is connected over a common conductor 63 to one side of a source of electrical current 64. When switch 66 is moved to its upper position a return circuit is completed from the other side of the source 64 over a speed controlling variable resistance 67, switch 66 and conductor 68 back to the two pump motors in parallel. The motors then turn in the direction indicated by the arrows pumping fluid upwardly through the sampling unit. They may be reversed by throwing switch 66 downwardly thereby to complete an alternative return circuit for the motors which extends from the upper side of the current source 64 over the variable resistance 67, switch 66 and conductor 69. When this is done fluid is drawn into the openings 19 at the upper end of the casing, pumped downwardly through the unit and expelled through the opening in the center of the cup 41.

In order to determine the electrical resistance of the fluid flowing between electrodes 46 and 47, galvanometer $G_1$ is provided at the surface in a series circuit which extends from the left-hand side of battery 71 over conductor 72, electrode 46, the fluid, electrode 47, common conductor 63, galvanometer $G_1$ and switch 73 back to the right-hand side of battery 71. Preferably the galvanometer in this circuit is calibrated to read directly in terms of specific resistance of fluid between the electrodes.

The output of generator 48 (which is a function of the rate of flow of the fluid) is registered by galvanometer $G_2$ over a circuit which extends from one side of the generator over conductor 74, switch 75, galvanometer $G_2$ and the common conductor 63 back to the other side of the generator. This galvanometer may be calibrated to read directly in terms of rate of flow.

A circuit extends from the left-hand side of battery 76 over conductor 77, the exposed portion of resistance wire 61, mercury 57, common conductor 63, galvanometer $G_3$ and switch 78 back to the right-hand side of battery 76. A similar circuit extends from the left-hand side of battery 80 over conductor 81, the exposed portion of resistance wire 62, the mercury in the U-tube, common conductor 63, galvanometer $G_4$ and switch 82 back to the right-hand side of battery 80. $G_3$ is controlled by the resistance of the exposed portion of wire 61 and preferably is calibrated to read directly in terms of the pressure which varies this resistance. Similarly $G_4$ should be calibrated directly in terms of the pressure differential between points $P_1$ and $P_2$ which controls the resistance of the exposed portion of wire 62.

It will be appreciated that the circuits shown are intended merely to be illustrative. Practical modifications will be apparent to those versed in the art, and indeed other circuits quite different from those shown might easily be devised for registering at the surface of the well the resistivity of the fluid flowing through the sampling unit, the rate of its flow and the pressures indicated.

Naturally, other circuit arrangements for reversing the pump motors 21 and 22 also might easily be employed, while it is obvious that the conductor 63 which is common to all of the electrical equipment in the sampling unit might be replaced by individual return conductors. It is contemplated that the wiring between the sampling unit and the surface equipment may take the form of a separate cable or, if desired, may be embodied in the cable 12 employed to raise and lower the sampling unit.

Use of the above described apparatus in a testing operation now will be explained. Assuming that it is desired to test the formation at a certain level below the surface, the sampling instrument is lowered in the drill hole until the depth registering device 16 indicates that it has reached the desired level, and there it is halted. During its descent the mud within the hole naturally is free to enter the opening in suction cup 41, circulate upwardly through the analyzing chamber and the pump and leave the sampling unit through the apertures 19.

With the sampling instrument at the desired level galvanometer switches 73, 75, 78 and 82 are closed; the resistivity of the fluid between electrodes 46 and 47 is noted from galvanometer $G_1$ while the bottom hole pressure is noted from galvanometer $G_3$. Then switch 66 is moved upwardly and resistor 67 is adjusted so that the pump motors drive their respective shafts at top speed in the direction indicated by the arrows. This pumps the fluid upwardly through pipe 38 and the analyzing chamber (and ultimately back out into the bore hole through apertures 19) creating a low pressure or suction at the mouth of suction cup 41. The movement of the fluid to the right in the lower (horizontal) leg of pipe 38 produces a leftward thrust at the bottom of the pipe, which, combined with the suction in front of cup 41, overcomes the tension of spring 43 and causes the pipe to swing about the flexible coupling 39 thereby advancing the suction cup to the position shown dotted, where its face engages the inner surface of the bore hole.

If it should happen that the suction cup makes poor contact with the side wall, this will be apparent at the surface because there will be little or no change in the resistivity of the fluid as registered by $G_1$, $G_2$ will indicate a relatively high rate of flow of the fluid and $G_3$ will indicate that the pressure in the analyzing chamber is near bottom hole pressure. In such a case the suction cup will be disengaged from the side wall by halting or reversing the pump motors, and another attempt to secure good contact will be made with the sampling instrument in a slightly different position in the hole.

When good contact is made with the side wall it may be found that the formation engaged is non-pay, i. e., that its permeability is low. If this is the situation, very little fluid can be drawn from the formation even with the pump motors operated at full speed, and accordingly the low permeability will be recognized at the surface by the fact that the rate of flow as indicated by $G_2$ is near zero, while the pressure as indicated by $G_3$ also is very low. Assuming however that the formation has reasonable permeability, the rock fluid now pumped from the side wall and through the sampling unit may comprise oil, gas, salt water, fresh water, or invasion water from the well itself. If it is salt water this fact will be recognized quickly for there will be a great decrease in the resistivity of the fluid, as indicated by $G_1$. On the other hand if the rock fluid is oil or gas a large increase in the resistivity registered by $G_1$ will reveal this; these two high resistance fluids may be distinguished from one another by their great difference in viscosity.

Viscosity of the rock fluid preferably is determined by adjusting the speed of the pump motors by means of variable resistance 67 until galvanometer $G_2$ indicates that rock fluid is flowing through the analyzing chamber at some rate which has been arbitrarily preselected for reference purposes. With the fluid flowing at a predetermined rate it can be shown that the viscosity of such fluid is proportional to the difference in pressure between points $P_1$ and $P_2$; in other words the greater the viscosity of the fluid the more its internal molecular construction will impede the movement of the fluid from $P_1$ to $P_2$ and consequently the greater will be the loss of pressure head between these two points. Galvanometer $G_4$ which measures this loss, or pressure differential, may be calibrated directly in units of fluid viscosity as well as in units of pressure if desired.

In the event that it is not convenient to use a standard rate of flow as the basis for all viscosity measurements, as suggested above, any other rate of flow may be selected and the viscosity then may be computed mathematically from readings of $G_2$ and $G_4$ taken while the fluid is flowing at such other rate. A determination of viscosity naturally is useful not only to distinguish oil from gas but to distinguish other fluids; for example, to distinguish fresh water from drilling mud.

It will be useful now to adjust the speed of the pump motors so that galvanometer $G_4$ stands at some arbitrary reading chosen for reference purposes, and when the adjustment has been made, to record the pressure in the analyzing chamber as indicated by $G_3$. Having done this, the speed of the pump motors next is reduced slowly by means of variable resistor 67 until the rock fluid ceases to flow through the sampling unit. At the moment the rate of flow indicated by $G_2$ reaches zero, the pressure in the analyzing chamber is indicated by $G_3$ just equals rock pressure and is recorded as such. Moreover the difference between rock pressure as thus recorded and the previously recorded reading of galvanometer $G_3$ is indicative of the permeability of the formation. More specifically when the flow of fluid through the analyzing chamber is reduced to zero from the aforementioned arbitrary starting point the change in pressure in the analyzing chamber will be comparatively large if the permeability of the rock formation is low and will be small if the permeability is high. Intermediate values of permeability may be determined by interpolation.

Knowing rock pressure, permeability also may be computed mathematically on the basis of readings of $G_3$ and $G_4$ taken simultaneously while rock fluid is flowing through the sampling instrument at any reasonable rate. These computations, like the previously mentioned computations to determine viscosity, form no part of the present invention; both involve the use of certain constants which may be determined by experimental use of the sampling instrument.

By making tests of the kind explained above at different depths, the well bore may be logged to determine the exact thickness of pay strata or any other such information as may be desired. In each case the suction cup 41 may be freed from the wall and returned to its normal position in the casing after the test has been made, simply by reversing the pump motors.

From the foregoing it will be seen that by facilitating the determination of the type of fluid in the rock, the viscosity of the fluid, the rock pressure, the permeability of the formation, and the thickness of pay strata, this invention is one well adapted to attain all of the ends and objects hereinbefore set forth together with other advantages which are obvious and which are inherent to the apparatus.

It will be understood that certain features and subcombinations of utility may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention I claim:

1. In a formation tester, a sampling device adapted to be lowered into an uncased bore hole, a suction cup carried by said device and having a rim engageable with the uncased side wall of the hole, an aperture in the rear of said cup, suction apparatus connected to said aperture to draw rock fluid into said cup from the portion of the side wall encircled by the rim of said cup, the side wall engaging face of said suction cup being provided with grooves extending radially inward to said aperture, whereby rock fluid passes through said grooves to said aperture even when the suction created by said apparatus presses the face of said cup flat against the side wall.

2. In a formation tester adapted to be lowered into a bore hole, a casing having an opening in one wall thereof, a suction cup movably supported by said casing so that it normally is positioned within said casing but is movable outwardly through said opening and into engagement with the side wall of the bore hole, a duct communicating at one end with the space between the concave face of said cup and the engaged side wall and communicating at the other end with the interior of said bore hole adjacent to said casing, and a pump in said casing adapted to draw rock fluid from the engaged surface of the bore hole and expel it from the other end of said duct into said hole.

3. In a formation tester adapted to be lowered into a bore hole, a casing, a duct within said casing opening at one end into the bore hole, said duct having at the other end a portion movable in a direction transverse to the axis of the bore hole, a flexible rim on said last portion adapted to engage the surface of the bore hole responsive to a transverse movement of said last portion, thereby to place said other end of said duct in communication with a limited area of the formation to the exclusion of the surrounding surface, and a pump in said duct for drawing rock fluid into the duct from said limited area of the formation.

4. In a formation tester, a casing adapted to be lowered into a bore hole, a duct within said casing, both ends of said duct normally communicating with the fluid in said hole, a pump connected to said duct to drive said fluid therethrough, means whereby the intake end of said duct moves laterally with respect to the axis of the bore hole responsive to the operation of said pump, and a flexible rim on the said intake end of the duct adapted to engage the side wall of the bore hole responsive to said lateral movement thereby to prevent the fluid in said bore hole thereafter from entering said intake end of said duct.

5. In a formation tester as claimed in claim 4 wherein said pump comprises two sets of impeller blades rotated in opposite directions about a vertical axis whereby there is no resultant torque tending to rotate said casing about said axis.

6. In a formation tester, a casing adapted to be lowered into a bore hole, a duct within said casing, both ends of said duct normally communicating with the fluid in said hole, a pump connected to said duct to drive said fluid therethrough, means whereby the intake end of said duct moves laterally with respect to the axis of the bore hole responsive to the operation of said pump, a flexible rim on the said intake end of the duct adapted to engage the side wall of the bore hole responsive to said lateral movement thereby to prevent the fluid in said bore hole thereafter from entering said intake end of said duct, and means to subsequently vary the speed of said pump thereby to vary the pressure on the portion of the side wall encircled by said rim.

7. In a formation tester, a sampling device adapted to be lowered into an uncased bore hole, said device including means constructed and arranged to engage the uncased side wall of the bore hole to form with a selected area thereof an enclosure from which the fluid outside of said enclosure in the bore hole is excluded, a duct communicating at one end with the interior of the enclosure and having its other end in open communication with the bore hole outside of said enclosure and adjacent thereto, a motor-driven pump in the duct for inducing a flow of fluid through the duct between the enclosure and the open bore hole, means for varying the speed of the pump, said sampling device including sensing means in communication with the fluid flowing through the duct and controlled variably by the fluid in accordance with variations in the speed of the pump.

8. In a formation tester, a sampling device adapted to be lowered into an uncased bore hole, said device including means constructed and arranged to engage the uncased side wall of the bore hole to form with a selected area thereof an enclosure from which the fluid outside of said enclosure in the bore hole is excluded, a duct communicating at one end with the interior of the enclosure and having its other end in open communication with the bore hole outside of said enclosure and adjacent thereto, a power-driven pump in the duct for drawing rock fluid into said enclosure from said selected area of the side wall and discharging it via said duct into the open bore hole, and a fluid pressure gauge connected to said duct at a point intermediate said enclosure and pump.

9. In a formation tester, a sampling device adapted to be lowered into an uncased bore hole, said device including means constructed and arranged to engage the uncased side wall of the bore hole to form with a selected area thereof an enclosure from which the fluid outside of said enclosure in the bore hole is excluded, a duct communicating at one end with the interior of the enclosure and having its other end in open communication with the bore hole outside of said enclosure and adjacent thereto, a power driven pump in the duct for drawing rock fluid into said enclosure from said selected area of the side wall and discharging it via said duct into the open bore hole, a differential pressure gauge connected to said duct at two longitudinally spaced apart points on the same side of said pump, and a constricted throat in said duct intermediate said two points.

10. In a formation tester, a sampling device adapted to be lowered into an uncased bore hole, said device including means constructed and arranged to engage the uncased side wall of the bore hole to form with a selected area thereof an enclosure from which the fluid outside of said enclosure in the bore hole is excluded, a duct communicating at one end with the interior of the enclosure and having its other end in open communication with the bore hole outside of said enclosure and adjacent thereto, a power driven pump in the duct for drawing rock fluid into said enclosure from said selected area of the side wall and discharging it via said duct into the open bore hole, a pair of electrodes making contact with the fluid in said duct at spaced apart points, an electrical circuit including said electrodes, and means in said circuit to register an electrical characteristic of the fluid between said electrodes.

11. In a formation tester, a sampling device adapted to be lowered into an uncased bore hole, said device including a short duct normally having both ends in open communication with the fluid in said bore hole, one end of said duct comprising a mouth opening toward the side wall of the bore hole and movable laterally into engagement with said wall thereby to place said one end of the duct in communication with a limited area of the side wall to the exclusion of the surrounding surface of the side wall and the fluid in the bore hole, a power operated pump in said duct for drawing rock fluid into the duct from said limited area of the formation and discharging it from the other end of the duct into the bore hole, and means in the duct to test the rock fluid entering same.

12. In a formation tester, a sampling device adapted to be lowered into an uncased bore hole, said device including a short duct normally having both ends in open communication with the fluid in said bore hole, one end of said duct comprising a mouth opening toward the side wall of the bore hole and movable laterally into engagement with said wall thereby to place said one end of the duct in communication with a limited area of the side wall to the exclusion of the surrounding surface of the side wall and the fluid in the bore hole, a power operated pump in said duct for drawing rock fluid into the duct from said limited area of the formation and discharging it from the other end of the duct into the bore hole, said sampling device including sensing means in communication with the fluid flowing through the duct and controlled variably by fluid in accordance with variations in the speed of the pump.

13. In a formation tester, a sampling device adapted to be lowered into un uncased bore hole, said device including a short duct normally having both ends in open communication with the fluid in said bore hole, one end of said duct comprising a mouth opening toward the side wall of the bore hole and movable laterally into engagement with said wall thereby to place said one end of the duct in communication with a limited area of the side wall to the exclusion of the surrounding surface of the side wall and the fluid in the bore hole, a power operated pump in said duct for drawing rock fluid into the duct from said limited area of the formation and discharging it from the other end of the duct into the bore hole, and a pressure gauge connected to said duct at a point intermediate said enclosure and the pump for registering the pressure of the rock fluid in the duct at that point.

14. In a formation tester, a sampling device adapted to be lowered into an uncased bore hole, said device including a short duct normally having both ends in open communication with the fluid in said bore hole, one end of the said duct comprising a mouth opening toward the side wall of the bore hole and movable laterally into engagement with said wall thereby to place said one end of the duct in communication with a limited area of the side wall to the exclusion of the surrounding surface of the side wall and the fluid in the bore hole, a power operated pump in said duct for drawing rock fluid into the duct from said limited area of the formation and discharging it from the other end of the duct into the bore hole, a differential pressure gauge connected to said duct at two longitudinally spaced apart points on the same side of the pump to register the relative pressure of the rock fluid at those two points, and a constricted throat in the duct intermediate said two points.

15. In a formation tester, a sampling device adapted to be lowered into an uncased bore hole, said device including a short duct normally having both ends in open communication with the fluid in said bore hole, one end of said duct comprising a mouth opening toward the side wall of the bore hole and movable laterally into engagement with said wall thereby to place said one end of the duct in communication with a limited area of the side wall to the exclusion of the surrounding surface of the side wall and the fluid in the bore hole, a power operated pump in said duct for drawing rock fluid into the duct from said limited area of the formation and discharging it from the other end of the duct into the bore hole, and electrical testing means having electrodes engaging the fluid in the duct.

16. A formation tester as in claim 11, wherein said pump is reversable to clear said duct of rock fluid, thereby to facilitate making successive tests on selected areas of the side wall without withdrawing said device from the bore hole.

JOSEPH H. LANE.

REFERENCES CITED

The following references are of record in the file of this patent:

UNITED STATES PATENTS

| Number | Name | Date |
|---|---|---|
| 1,652,472 | Erwin et al. | Dec. 13, 1927 |
| 1,963,011 | Albersheim et al. | June 12, 1934 |
| 2,085,972 | Halliburton | July 6, 1937 |
| 2,198,821 | Jessup | Apr. 30, 1940 |
| 2,262,655 | Seale | Nov. 11, 1941 |
| 2,289,687 | Stuart | July 14, 1942 |
| 2,297,020 | Page | Sept. 29, 1942 |
| 2,309,697 | Gunderson | Feb. 2, 1943 |
| 2,313,176 | Shelby | Mar. 9, 1943 |
| 2,332,567 | Gardner | Oct. 26, 1943 |
| 2,334,920 | Gosline et al. | Nov. 23, 1943 |
| 2,377,501 | Kinley | June 5, 1945 |
| 2,426,393 | Fischer | Aug. 26, 1947 |